FIG. 1

INVENTORS
George H. Bateman
Robert L. Freeman
Darrel W. Holbrook
BY
Mason, Kolehmainen, Rathburn & Wyss
Attys.

Patented Apr. 20, 1954

2,676,084

UNITED STATES PATENT OFFICE 2,676,084

APPARATUS FOR INDICATING INSTANTANEOUSLY AND AT A REMOTE POINT THE TUNING CONDITION OF ONE OR MORE WAVE SIGNAL RECEIVERS

George H. Bateman, Chicago, and Robert L. Freeman, Evanston, Ill., and Darrel W. Holbrook, Ladysmith, Wis., assignors to A. C. Nielsen Company, a corporation of Illinois Application February 2, 1949, Serial No. 74,074

15 Claims. (Cl. 346—37)

The present invention relates to a system and apparatus for indicating at a remote point the instantaneous condition of one or more wave signal receivers. Specifically the present invention is an improvement on copending Black application, Serial No. 625,371, filed October 29, 1945 and assigned to the same assignee as the present application.

In recent years it has become apparent that instrumented methods of determining the listening habits of users of wave signal receivers is the only satisfactory way of obtaining accurate information in this regard. In many cases it is desirable that information with respect to the tuning condition of a plurality of wave signal receivers be instantaneously available at a central station or central point remote from the place where the receivers are located so that the analysis organization which prepares an analysis of the listening habits of wave signal receiver users may have this information to prepare reports with a minimum of delay. It will be understood that if it is necessary to record the information at the various homes in which the wave signal receiver use is to be logged that the gathering of the recorded information at the end of each day for example is, if not impossible, at least prohibitive from a cost standpoint. Obviously, if the record produced of the tuning conditions of the receivers is permitted to accumulate for a predetermined calendar period of a week, two weeks, or longer as is usually the case, a substantial delay in the report, which is eventually prepared based on the facts obtained by the instrumented methods, is immediately introduced. Consequently, it is desirable, particularly in areas where a substantial number of homes are logged, to have an arrangement whereby the information of the tuning condition of receivers is instantaneously available at a central station.

Accordingly, it is an object of the present invention to provide new and improved apparatus for indicating at a remote point which may be a central indicating or recording station, the tuning condition of receivers located at distant points from the recording station.

A further object of the present invention is to provide new and improved radio receiver tuning indicating apparatus for instantaneously indicating at a remote point the tuning condition of a radio receiver.

A further object of the present invention is the provision of a new and improved remote radio receiver tuning indicating means, comprising synchronous means at the remote recording or indicating point and additional synchronous means associated with the wave signal receiver being monitored together with means for maintaining said synchronous means in synchronism so that accurate and instantaneous indications of the tuning condition of the wave signal receiver will be produced at such point remote from the receiver.

Still another object of the present invention is to provide synchronous instantaneous apparatus disposed at a central station or recording point remote from homes where wave signal receivers to be logged are located and cooperative with synchronous means located at such homes for continuously, instantaneously and accurately indicating not only the tuning condition of such wave signal receivers, but also whether such receivers are turned on or off.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which.

In brief the present invention has for its primary purpose the instantaneous indication or recording, or both, at a central station of the tuning condition of wave signal receivers located in various homes. These homes will constitute a sample representative of all the listeners of particular transmitting stations, or viewers in the case of television. It will be understood that the actual sample will comprise several hundred or even hundreds of broadcast receivers located in homes within the radiation areas of different wave signal transmitters broadcasting the particular programs of interest. By obtaining accurate information with respect to the tuning conditions of all the receivers employed in the homes constituting the sample, it is possible to make a statistical analysis of the listening habits from which the various factors affecting the sales effectiveness of particular radio programs or advertising schemes may be arrived at. It will be understood that the collaborator homes, that is the homes in which wave signal receiver use is to be logged, shall be chosen on a basis such that all of the variable factors, as for example, the number of potential listeners, economic affluence, religion, etc. which normally affect any process of sampling public opinion, are accounted for on a weighted basis. The present invention is concerned with an arrangement whereby at a central recording point a record or indications may be produced of the tuning conditions of a plurality of wave signal receivers included within the sample. Since the central station is under the control of the analysis organization the information with respect to the tuning conditions of the receivers is continuously and instantaneously available to the analysis organization whereby it is possible to analyze the data received and preferably recorded and produce the necessary reports in a minimum of time.

Figure 1:
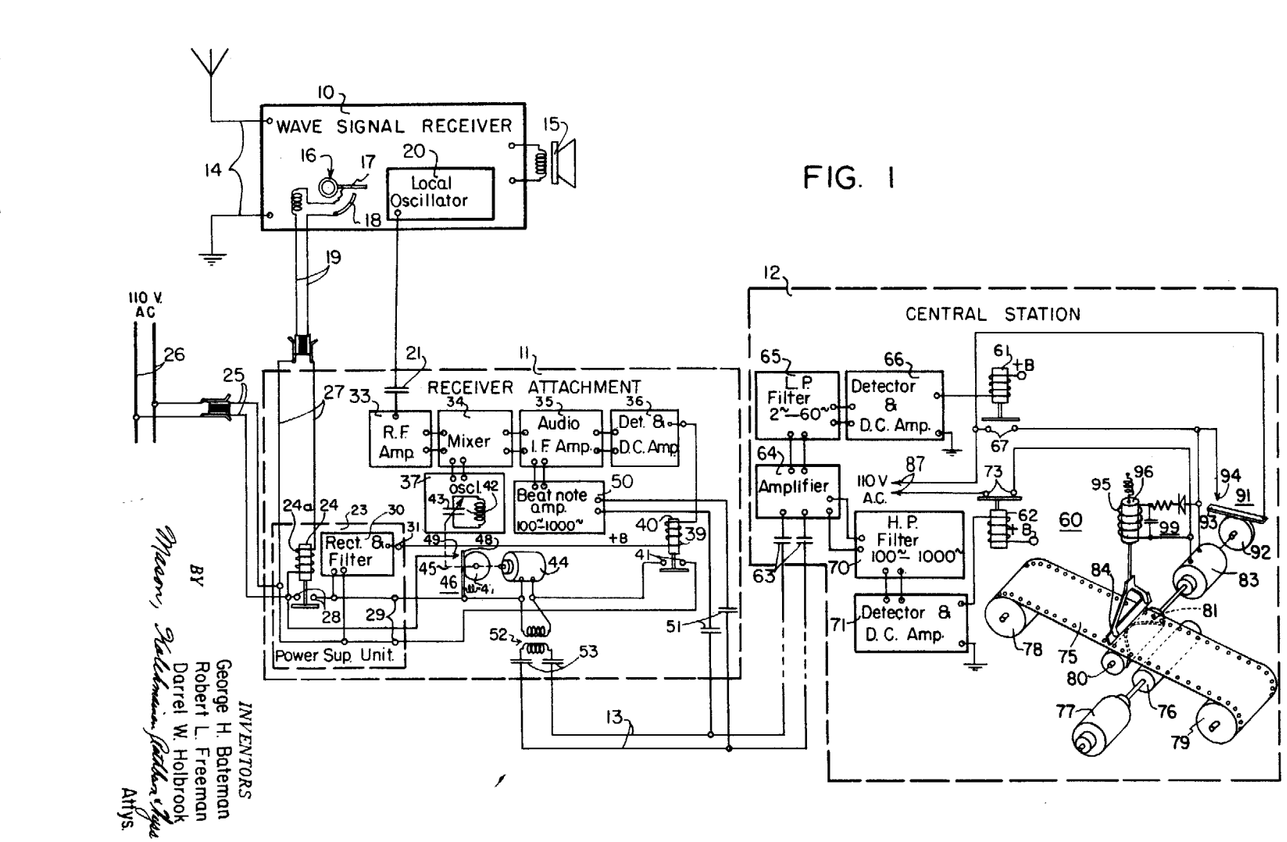
Fig. 1 is a schematic representation of one embodiment of the present invention.

Referring now to Fig. 1 of the drawings, it will be apparent that the apparatus or system of the present invention essentially comprises two main units which are used in association with a wave signal receiver such as 10. These units comprise a receiver attachment 11 and a central station 12. Although only a single wave signal receiver 10 has been illustrated, it should be understood that a plurality of wave signal receivers located in the same or different homes would normally be employed and with each of these wave signal receivers there would be provided a receiver attachment 11. For one or more of the wave signal receivers 10 and receiver attachments 11 there would only be a single central station 12 which as is illustrated in the drawings is connected to the receiver attachment by a pair of telephone lines 13 which may be leased telephone lines or the like. These telephone lines are indicated with a dotted portion to designate the remote relationship between the central station 12 and the receiver attachment 11.

Preferably the receiver attachment 11 is closely associated with the receiver 10 and furthermore is preferably of sufficiently small bulk so as to be readily disposed within the available space in the cabinet of the wave signal receiver 10.

As illustrated the wave signal receiver 10 comprises an antenna ground circuit 14 and a signal reproducer or loud speaker 15. The wave signal receiver 10 further includes the conventional manual on-off switch 16 which normally also comprises the manual volume control means. This on-off switch 16 comprises a pair of relatively movable contacts 17 and 18 for controlling the flow of current through a suitable power cord 19 when the power cord is connected to a suitable source of electrical energy.

It will be understood that the wave signal receiver 10 might comprise any type of wave signal receiver which is capable of controlling the receiver attachment in a predetermined manner in dependence upon the tuning condition of the wave signal receiver 10. For example the receiver attachment may be controlled by a mechanical connection with the wave signal receiver (see Fig. 4 of the drawings) so that the mechanical positioning of the tuning mechanism of the wave signal receiver 10 produces a predetermined control of the receiver attachment 11. As illustrated in Fig. 1 of the drawings, however, the wave signal receiver 10 is a superheterodyne receiver comprising the conventional local oscillator 20 which is capable of producing an output signal uniquely indicative of the tuning condition of the wave signal receiver 10. The signal output of the local oscillator 20 of the wave signal receiver 10 is suitably coupled as by means of a coupling capacitor 21 with the receiver attachment 11 in a manner to be described in detail hereinafter.

For the purpose of rendering the receiver attachment 11 operative when and only when the wave signal receiver 10 is turned on the receiver attachment 11 is provided with a power supply unit generally designated at 23 which comprises a series relay 24 having its winding 24a connected in series with the wave signal receiver power cord 19, when the receiver attachment 11 is operatively associated with the wave signal receiver 10. As illustrated the power supply unit 23 is connected by means of a power cord 25 with a suitable source of alternating potential 26, and the power cord 19 of the wave signal receiver 10 is connected in series relationship with the winding 24a of the relay 24 as by means of suitable conductors 27. When the receiver 10 is turned on the relay 24 is energized and when the receiver 10 is turned off the relay 24 is deenergized. The relay 24 comprises a pair of normally open contacts 28 which are adapted to be closed when the wave signal receiver 10 is turned on so as to provide alternating potential at the alternating current terminals 29 of the power supply unit 23. The relay 24 further controls the energization of the rectifier and filter unit 30 so as to provide a source of +B potential at the terminal 31 of the power supply unit 23.

In order to provide a signal indicative of the tuning condition of the wave signal receiver 10 which may be transmitted to a remote point such as the central station 12 for performing a suitable control function, the receiver attachment 11 includes a unit which is sometimes referred to as a hunter unit since when rendered effective it performs a hunting operation to hunt a position or a characteristic indicative of the tuning condition of the wave signal receiver 10. This hunter unit as illustrated comprises a superheterodyne receiver including a radio frequency amplifier stage or unit 33, a mixer unit 34, an audio intermediate frequency amplifier unit 35, a detector and direct current amplifier unit 36 and an oscillator unit 37. Except for the oscillator unit 37 the units 33 to 36 inclusive are connected in tandem in the order named. The signal output from the local oscillator 20 is supplied through the coupling capacitor 21 to the radio frequency amplifier stage 33 from where it is mixed in the mixer stage 34 with the output signal of the oscillator 37. If the output of the mixer stage 34 has a predetermined frequency equal to the audio intermediate frequency then a signal is supplied to the detector unit 36 which is capable of being detected. The amplified output of the detector 36 is connected to the source of +B potential through a suitable winding 39 of a relay 40. The relay 40 is normally energized to close its contacts 41 when a source of +B potential is available at the terminal 31 and no signal is detected by the detector 36. If a signal is detected the relay 40 is deenergized to open its contacts 41. The contacts 41 are shown in the open position since the relay 28 controlling the supply of +B potential at the terminal 31 is in the open position due to the fact that the wave signal receiver 10 is turned off.

To produce the hunting operation mentioned above the oscillator 37 comprises a tuned circuit 42 including a resonant frequency varying means schematically illustrated as a variable capacitor 43. The capacitance of the capacitor 43 is variable through the frequency spectrum of the oscillator 37 as for example by being driven by a synchronous motor and gear train unit 44 capable of rotating the rotor plates of the condenser 43 through a shaft 45 preferably at a speed of one revolution per minute. It will be apparent that if the synchronous motor 44 is energized whenever the signal outputs of the local oscillators 20 and 37 do not bear a predetermined relationship to each other with respect to frequency, and is deenergized whenever the frequencies of the signal outputs of such oscillators bear a predetermined relationship to each other that the hunter unit will hunt the correct signal and stop. This is accomplished in accordance with the present invention by connecting the contacts 41 of the relay 40 in series with the energization circuit of the synchronous motor 44.

For reasons fully disclosed in the above mentioned copending Bateman and Krahulec application, Serial No. 33,798 filed June 18, 1948, and assigned to the same assignee as the present application it is desirable to have the synchronous motor 44, when deenergized, stop at a suitable indexing or homing position which is the same at all times. Accordingly there is provided a cam operated switch generally designated at 46 comprising a cam 47 driven by the motor 44, and a switching member 48, engageable with a stationary contact 49. The switching member 48 is adapted to engage the stationary contact 49 for all positions of the synchronous motor 44 except the homing or indexing position thereof. The cam controlling switch 46 is adapted to parallel the contacts 28 of the series relay 24, whereupon the synchronous motor 44 once it is energized remains energized even though the contacts 28 are opened until it has moved to its indexing or homing position whereupon the cam controlled switch 46 interrupts the motor circuit.

Preferably the intermediate frequency of the unit 35 is an audio frequency chosen somewhere between 100 and 1,000 cycles. It will be apparent that when the capacitance of the capacitor 43 approaches a position corresponding to the tuning condition of the wave signal receiver 10 that a particular beat note is produced in the mixer unit 34. In accordance with the present invention a beat note amplifier 50 is provided capable of amplifying a particular beat note of a frequency between 100 to 1,000 cycles obtained from the mixer unit 34. This particular note when amplified by the amplifier 50 is supplied through suitable capacitors 51 to telephone lines 13 interconnecting the receiver attachment 11 with the central station 12. Preferably also the terminals of the synchronous motor 44 are connected to the telephone lines 13 through a suitable step down transformer 52 and coupling capacitors 53. With this arrangement it will be observed that upon energization of the synchronous motor 44 a 60-cycle potential will be supplied to the telephone lines 13. Furthermore when the hunter unit approaches its "on-signal-position" it indicates the tuning condition of the wave signal receiver 10 and at such time a signal is detected by the detector unit 36 causing deenergization of the relay 40. Simultaneously therewith a beat note is produced in the mixer unit 34 which is supplied to the telephone lines 13 for the purpose of performing a predetermined control function which is described in greater detail hereinafter.

In accordance with the present invention there is provided at the central station 12 suitable apparatus controlled in response to the signals supplied to the telephone wires 13 through the coupling capacitors 51 and 53 respectively. As illustrated there is provided at the central station 12 a recorder generally indicated at 60 which is controlled in response to the signals supplied over the telephone lines 13. The recorder 60 is furthermore controlled by a pair of relays designated as 61 and 62 respectively. The relay 61 is controlled by a signal path including the telephone wires 13, the coupling capacitors 63, an amplifier 64, a low pass band filter 65 and a detector and direct current amplifier 66. The low pass band filter 65 is designed so as to pass low frequency alternating currents within the range of two to sixty cycles per second. It will be apparent therefore that with this arrangement the relay 61 is controlled in response to the 60-cycle energy supplied to the telephone lines 13 through the coupling capacitors 53. Preferably the relay 61 has its winding connected in series with a source of +B potential supplied to the detector and direct current amplifier 66. When no sixty cycle signal is received by the detector 66, the relay 61 is energized as illustrated in the drawings to open the contacts 67. When the sixty-cycle signal is detected the relay 61 is deenergized and the contacts 67 are closed.

The central station 12 includes a second signal path including the telephone wires 13 which comprises in addition to the wires 13 and the coupling capacitor 63 and amplifier 64, a high band pass filter 70, and a detector and direct current amplifier 71. The high pass band filter 70 is preferably designed to pass signals of a frequency corresponding to the beat note supplied from the beat note amplifier 50. Whenever a beat note is supplied by the receiver attachment 11 through the coupling capacitors 51 a signal is detected by the detector 71 to cause deenergization of the relay 62 to open its normally closed contacts 73. The relay 62 is normally energized to close the contacts 73 as shown in Fig. 1 of the drawings when no signal is detected.

With the above described arrangement it is apparent that the receipt of a sixty-cycle signal at the central station 12 causes contacts 67 to close, and the receipt of a beat note signal, causes the contacts 73 to open. This operation of the relays 61 and 62 is employed to control the recorder 60 in a manner to be described hereinafter.

Figure 2:
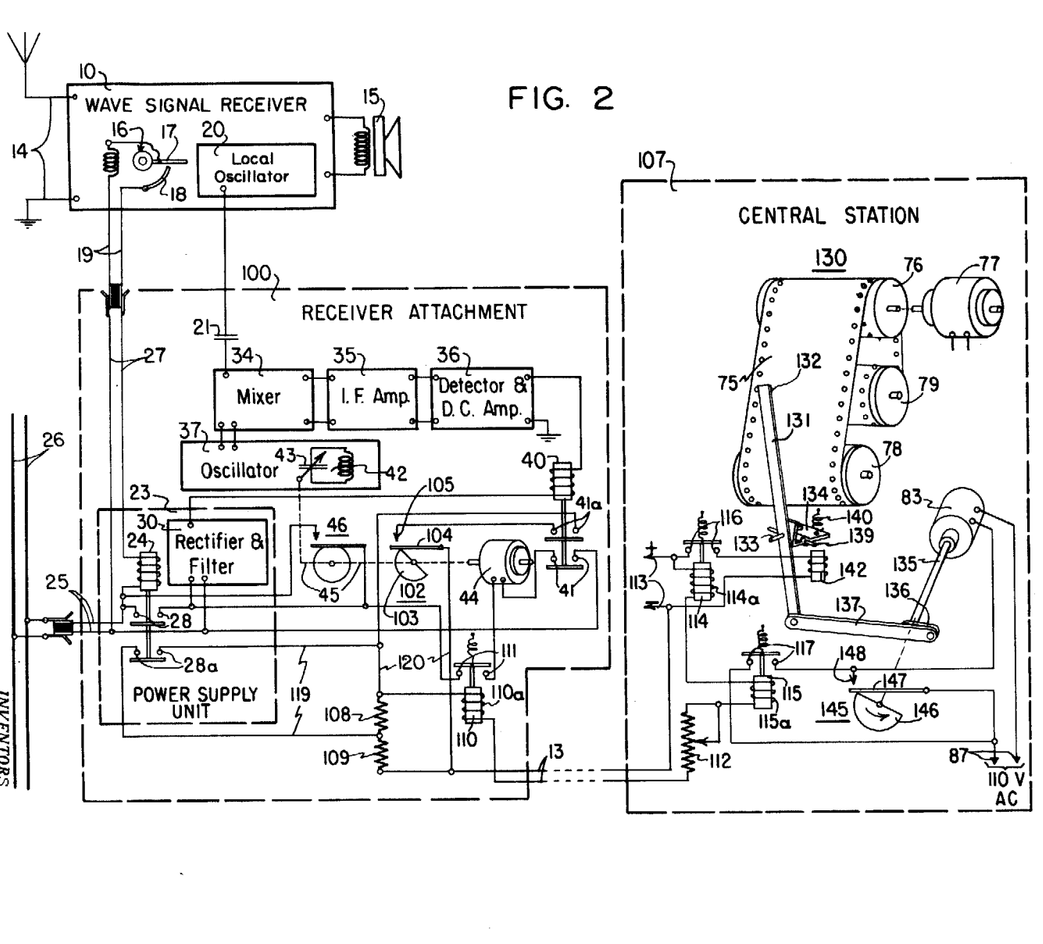
Fig. 2 is a schematic representation illustrating still another embodiment of the present invention.
Figure 4:
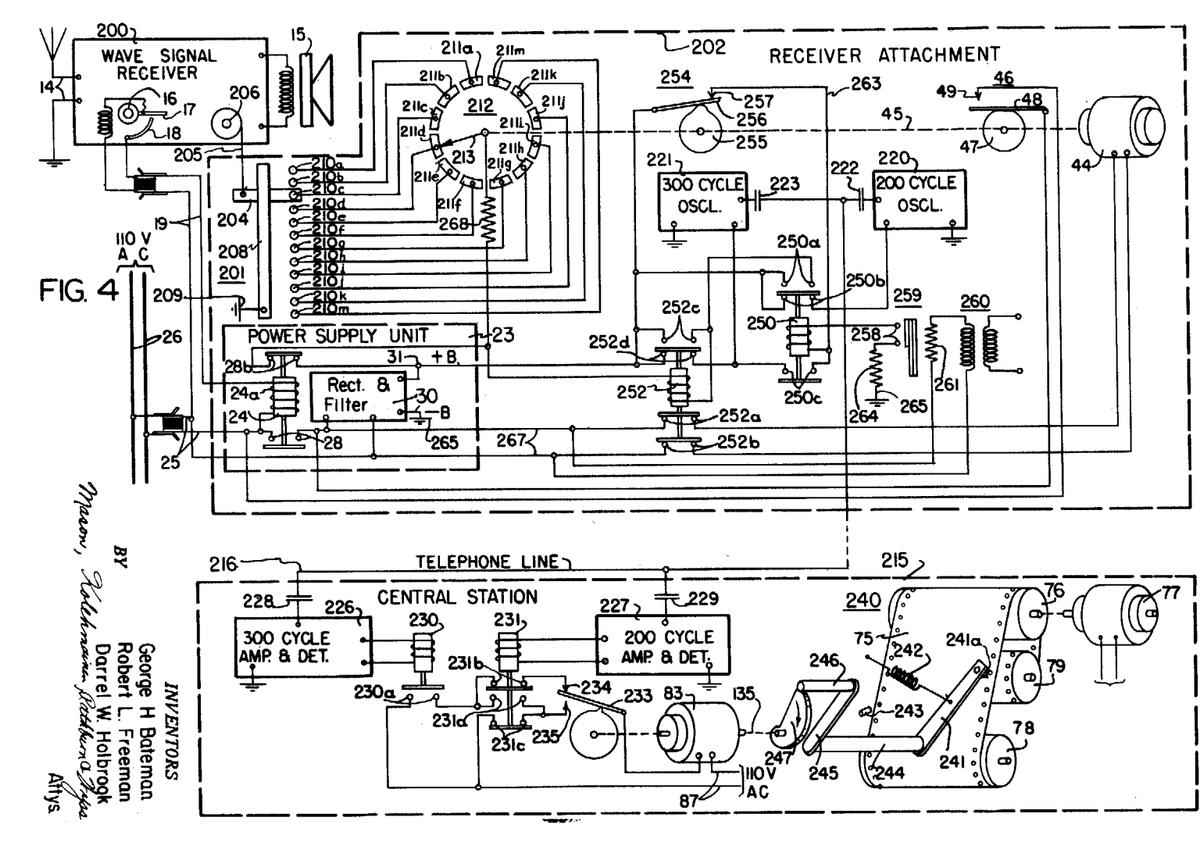
Fig. 4 is a schematic diagram of still another embodiment of the present invention.

It will be understood that the recorder 60 may comprise any type of recorder such, for example as are shown in Figs. 2 and 4 of the drawings. As illustrated, however, the recorder 60 is of the type shown in copending Krahulec et al. application, Serial No. 147,304, filed March 2, 1950, and also assigned to the same assignee as the present application. This recorder 60 comprises a movable recording element 75 in the form of a record tape having perforations along both edges so as to be driven by a rotatable sprocket 76 drivingly connected to a synchronous motor 77. Preferably the motor 77 continually drives the sprocket 76 so as to cause the tape 75 to move at a constant speed from a supply spool 78 to a take up spool 79.

For the purpose of producing a record on the recording element 75 at various transverse positions thereof which would be indicative of the tuning condition of the wave signal receiver 10 there is provided a rotatable member 80 in the form of a cylinder having a raised helix 81 formed on the outer surface thereof which helix makes one complete revolution within the confines of the recording element 75. Preferably the cylinder 80 supporting the helix is adapted to be rotated at one revolution per minute by means of a synchronous motor and gear train unit 83. Means may be provided for continually biasing the recording element 75 into engagement with the helix 81 to produce the desired record indications on the recording element 75. As illustrated, however, the helix 81 is normally free of the recording element 75 and does not engage the same. A suitable solenoid actuated printer bar 84 is provided which is capable of engaging the recording element 75 to press it into engagement with the helix 81 so as to produce a record indication at points positioned transversely of the recording element 75 depending upon the particular portion of the helix 81 which is effective at the time the printer bar 84 is moved into engagement with the recording element 75.

As illustrated the synchronous motor 83 is connected to a source of alternating current potential generally designated at 87 through the serially arranged contacts 67 and 73 of the relays 61 and 62 respectively. Whenever a sixty-cycle signal is received at the central station 12, the relay 61 closes its contacts 67 to energize the motor 83 which rotates the cylinder 80 at a synchronous speed, and if the synchronous motor 83 starts from an indexing position identical with the homing position of the synchronous motor 44 then the helix 81 is positioned in predetermined manners corresponding exactly to the position of the rotor plates of the capacitor 43. When a beat note frequency is received at the central station 12 the contacts 73 of the relay 62 are opened and the synchronous motor 83 stops. It will be apparent that with this arrangement the synchronous motor 83 can be caused to operate in exactly the same manner as the synchronous motor 44.

In order that the synchronous motor 83 may initially start from a homing or indexing position so that at all times it is maintained in synchronism with the motor 44, a suitable cam actuated switch generally designated at 91 is provided which is very similar to the cam operated switch 46 described above. This cam operated switch 91 comprises a cam 92 which is rotatable by the motor 83. The cam 92 has a flat surface at one portion thereof for controlling a switching member 93 which is engageable with a stationary contact 94. The cam operated switch 91 is connected in parallel with the contacts 67 of the relay 61 and completes such a parallel circuit at all times except when the synchronous motor 83 is in its homing or indexing position illustrated in Fig. 1 of the drawings.

As was mentioned above the printer bar 84 may be continually biased so as to cause the helix 81 to engage the recording element at all times whereupon a trace is produced transversely of the element 75 depending upon the particular position of the cylinder 80 upon which the helix 81 is mounted. As illustrated, however, the printer bar is normally biased out of engagement with the recording element 75 and is moved into engagement therewith upon energization of the winding 95 of a suitable solenoid 96 which is energized with a direct current potential by virtue of a rectifier and filter unit generally designated at 99 whose input terminals are connected across the motor circuit for the synchronous motor 83. Consequently the printer bar 87 is rendered effective to cause a trace to be produced upon the recording element 75 whenever the motor 83 is energized.

Considering now the operation of the arrangement disclosed in Fig. 1 it will be noted that when the receiver 10 is turned off the power supply unit 23 is deenergized and no signal is supplied from the receiver attachment 11 to the telephone wires 13. The central station 12 on the other hand is energized so that the relays 61 and 62 assume the positions shown and of course the synchronous motor 77 drives the recording element 75 at constant speed or in some other predetermined manner with respect to time. When the wave signal receiver 10 is turned on current flows through the winding of the series relay 24 causing it to close its contacts 28 whereupon both alternating current and +B potential are available at the terminals of the power supply unit 23. By virtue of the cam switches 46 and 91 the synchronous motors 44 and 83 are in an indexing or homing position which is identical for each of the motors. As soon as the electron discharge valves in the receiver attachment 11 warm up following the turning on of the receiver 10 the relay 40 is energized to close its contacts 41 and to energize the motor 44 which begins to rotate the plates of the variable condenser 43 hunter unit described above. Simultaneously a 60-cycle potential is applied to the telephone wires 13 causing the relay 61 to close its contacts 67 at the central station 12 whereupon the synchronous motor 83 follows the movement of the synchronous motor 44. It will be apparent therefore that the position of the helix 81 at the central station 12 will correspond with the position of the rotor of the condenser 43 at the receiver attachment 11. The hunter unit at the receiver attachment 11 will hunt the channel to which the wave signal receiver 10 is tuned and as it approaches a position corresponding to the tuning condition of the wave signal receiver 10 the detector 36 detects a signal causing deenergization of the relay 40 thereby stopping the motor 44 at a predetermined position corresponding to the tuning condition of the wave signal receiver 10. The signal detected at the detector 36 is a beat note frequency which is transmitted by the telephone wires 13 and the signal path comprising the high pass band filter 70 at the central station 12. This results in the deenergization of the relay 62 to open the circuit of the synchronous motor 83 to stop the synchronous motor 83 at a point corresponding to the position of the synchronous motor 44. It will be understood that upon deenergization of the synchronous motor 44 the relay 61 at the central station 12 is again energized to open the contacts 67. Unless the recorder 60 is in the homing position shown in Fig. 1 of the drawings the cam switch 91 is closed thereby effectively rendering the operation of the relay 61 ineffective and turning complete control of the synchronous motor 83 over to the relay 62. While the motor 83 is energized the solenoid 96 is also energized to render the printer bar 87 effective to produce a trace on the recording element 75. The end of the trace is therefore indicative of the tuning condition of the wave signal receiver 10 and the absence of a trace while the motor 83 is moved toward a homing position indicates that the wave signal receiver 10 is not turned off. It will be understood that the printer bar 87 may be in continual engagement with the recording element 75 in which case a continuous indication of the tuning condition of the wave signal receiver 10 is produced.

From the above description it will be noted that there has been provided an arrangement whereby through employment of two synchronous motors at remote points interconnected by telephone lines 13 a continuous and instantaneous record of the tuning condition of a wave signal receiver is produced and a simple means for maintaining these motors in synchronism is provided.

With the arrangement disclosed in Fig. 1 control of the synchronous motor at the remote station is obtained by transmitting signals having different frequency characteristics for producing the desired control. It will be understood that other variable characteristics may be employed for producing such control. In Fig. 2 of the drawings there is illustrated an arrangement whereby variations in current magnitude control the recording unit at the central station and particularly maintain the synchronous motors at the receiver attachment and the central station in synchronism at all times.

Referring now to Fig. 2 of the drawings there is illustrated another embodiment of the present invention in which the corresponding elements thereof are designated by the same reference numerals as in Fig. 1 of the drawings. The wave signal receiver 10 has associated therewith a receiver attachment 100 which includes a hunter unit very similar to the hunter unit described in connection with Fig. 1. The radio frequency amplifier 33 and the beat note amplifier 50 have been omitted. The relay 40 has been provided with an additional set of contacts 41a over and above the contacts 41 described above. Similarly the serially arranged relay 24 of the power supply unit 23 is provided with an additional set of normally open contacts 28a. The synchronous motor 44 drives an additional cam switch generally indicated at 102, comprising a cam 103, a switch member 104 and a stationary contact 105. The cam switch 102 is illustrated as being connected in series with the contacts 41a and is adapted to maintain the switch 104 closed through 180° of rotation of the synchronous motor 44 and to open the switch through the other 180° of rotation.

For the purpose of interconnecting the central station generally designated at 107 and the receiver attachment 100 the telephone wires 13 are again employed. As illustrated the telephone wires 13 at the receiver attachment end are connected together through a pair of serially arranged resistors 108 and 109 and the winding 110a of a relay 110. The relay 110 is provided with normally open contacts 111 which are connected in series with the energization circuit of the synchronous motor 44. The relay 110 is a relatively sensitive relay and by way of example may comprise a relay capable of closing its contacts 111 when a current of three milliamperes or more flows through the winding 110a and consequently through the telephone wires 13. At the recorder end of the central station 107 the telephone wires 13 are connected to a source of direct current potential generally designated at 113 through the serially arranged windings 114a and 115a of relays 114 and 115 respectively. A suitable adjustable resistor 112 is preferably also provided to adjust the initial impedance of the telephone wires 13.

Preferably the relay 114 is more sensitive than the relay 115 but less sensitive than the relay 110. By way of example if the relay 110 is chosen to close its contacts 111 when a current of three milliamperes flows through the telephone wires 13 the relay 114 might be chosen to close its normally open contacts 116 when a current of 6 milliamperes flows through the telephone wires 13 and the relay 115 might be chosen to close its normally open contacts 117 when a current of 12 milliamperes flows through the telephone wires 13.

The resistors 108 and 109 preferably have such values of resistance that when proper adjustment of the resistor 112 is made a current of three milliamperes flows through the telephone wires 13 and the resistors 108 and 109 in series, assuming both resistors 108 and 109 are fully effective. The resistor 108 is adapted to be short circuited or by-passed by a suitable circuit indicated at 119 including the normally open contacts 28a of the series relay 24. When the contacts 28a are closed and the resistor 108 is short circuited a current of approximately six milliamperes is caused to flow through the telephone wires 13 due to the proper choice of the resistor 109. If the resistor 109 and the resistor 108 are both short circuited, which is accomplished by means of a circuit 120 including a cam switch 102 and the contacts 41a of the relay 40, then the current flowing through the telephone wires 13 preferably has a value of 12 milliamperes.

With the arrangement described it will be apparent that three levels of current are capable of being caused to flow through the telephone wires 13 to perform the desired control operations. When the wave signal receiver 10 is turned off the elements at the receiver attachment 100 are in the position indicated and the resistors 108 and 109 are effective to limit the current flowing in the telephone wires 13 to a minimum value which, however, is sufficient to energize the relay 110 to close its contacts 111. The relay 110 is effectively a power failure relay in that it opens the circuit of the motor 44 in the event of a failure of the power at the source 113, which is illustrated as a direct current source, or an open circuit occurs in the telephone wires 13. By virtue of the cam switch 46 the synchronous motor 44 always starts from an indexing or homing position when the receiver 10 is turned on. It will be apparent that when the receiver 10 is turned on, and assuming no failure of the power source 113, and no open telephone wire, the series relay 24 closes its contacts 28 and 28a. The contacts 28 supply power to the relay 40 causing it to close its normally open contacts 41 and 41a, as soon as the electron discharge valves in the receiver attachment 100 are heated sufficiently. Since the motor 44 is in its indexing or homing position when the receiver 10 is first turned on by virtue of the operation of the cam switch 46 the hunter unit starts its return stroke during which time the cam switch 102 maintains the circuit 120 through the contacts 41a in the open condition. The synchronous motor 44 rotates the rotor blades of the capacitor 43 in an effort to hunt the tuning position of the receiver 10. Since the contacts 28a of the series relay 24 have shorted the resistor 108 a current of an intermediate level flows through the telephone wires 13 which current is sufficient to cause the relay 114 to close its contacts 116.

As illustrated in Fig. 2 there is provided at the central station 107 a recorder unit generally designated at 130 having the corresponding parts thereof designated by the same reference numerals as in the preceding figure. Instead of the helical type of recorder there is illustrated a pivotally mounted stylus 131 having an inscribing point 132 for engagement with the recording element 75. The stylus 131 is illustrated at 133 as being pivotally mounted to a support 134. The stylus 131 is driven by a suitable synchronous motor 83 to move back and forth across the recording element 75. As illustrated the synchronous motor 83 is connected to the end of the stylus 131 remote from the inscribing point 132 by means of a shaft 135 a crank arm 136 and a link 137. Preferably the synchronous motor 83 causes the shaft 135 to rotate at one revolution per minute in the same manner as the motor 44 causes the rotation of the cam 103 at one revolution per minute.

For the purpose of controlling the effectiveness of the inscribing point 132 of the stylus 131 the support 134 is preferably pivotally mounted as indicated at 139 and is biased by means of a spring 140 so that the inscribing point 132 is normally out of engagement with the recording element 75. Preferably a portion of the support 134 forms the armature of an electromagnet comprising the winding 142. Energization of the winding 142 of the electromagnet causes the inscribing point 132 of the stylus 131 to engage the recording element 75 in a trace producing manner. As illustrated the winding 142 of the electromagnet is connected to a source of potential, indicated as the source 113, by means of the normally open contacts 116 of the relay 114.

The normally open contacts 117 of the relay 115 are adapted to control the energization of the motor 83 by connecting it to a suitable source of potential designated at 87. Preferably the synchronous motor 83 drives a cam switch 145 comprising a cam 146, a switching member 147 and a stationary contact 148. The cam switch 145 is adapted to close the energizing circuit of the synchronous motor 83 during the so-called retrace period when the stylus 132 moves from the right hand edge of the recording element 75 as viewed in Fig. 2 of the drawings to the left hand edge where it is specifically shown in Fig. 2. The synchronous motor 83 is therefore automatically moved to the left hand edge of the tape 75 whenever it reaches its extreme right hand position regardless of the conditions at the receiver attachment 100. The synchronous motor 44 on the other hand by virtue of the cam switch 46 always assumes a position when the receiver 10 is turned off, which corresponds to the position of the stylus 131 when at the right hand edge of the tape 75 as viewed in Fig. 2 of the drawings.

Considering now the operation of the arrangement disclosed in Fig. 2 of the drawings it is assumed first that the receiver 10 is turned off and all of the elements of the device are in the position shown in Fig. 2 of the drawings, with the exception of the relay 110 which is energized to close its contacts 111 since it is assumed that the telephone wires 13 are intact and power is applied at the terminals 113. As the receiver 10 is turned on the series relay 24 is energized to supply power to the hunter unit. Simultaneously the contacts 28a short circuit the resistor 108 whereupon the magnitude of the current flowing in the telephone wires 113 is increased sufficiently to energize the relay 114 to cause the inscribing point 132 of the stylus 131 to engage the recording element 75. Upon sufficient heating up of the electron discharge valves embodied in the receiver attachment 100 the relay 40 is energized to close its contacts 41 and 41a. Consequently motor 44 begins to rotate to cause the hunter unit to hunt the channel to which the receiver 10 is tuned. As soon as the synchronous motor 44 reaches the beginning of the hunting cycle which corresponds to the position of the motor 83 shown in Fig. 2 of the drawings the cam switch 102 closes to short out the resistors 108 and 109, whereupon the magnitude of the current flowing through the telephone wires 13 is increased sufficiently to energize the relay 115 as well as the relay 114, and the synchronous motor 83 causes the stylus 131 to move in synchronism with the synchronous motor 44. As the hunter unit reaches a position indicative of the tuning condition of the wave signal receiver 10 the detector 36 detects a signal which deenergizes the relay 40 with the consequent opening of the contacts 41 and 41a, to remove the by-pass around the resistors 108 and 109 and to stop the synchronous motor 44. Since the by-pass around resistor 108 is still effective, the current flowing through the telephone wires 13 drops to an intermediate level with the consequent deenergization of the relay 115 so that the synchronous motor 83 stops at a position corresponding to the tuning condition of the receiver 10. The stylus 131 remains effective to produce a trace on the recording element 75, the transverse position of which is indicative of the tuning condition of the wave signal receiver 10. As long as the tuning condition of the receiver 10 remains unchanged the stylus 131 continues to make a straight line trace on the recording element 75.

If the tuning of the receiver 10 is changed the hunter unit again operates through energization of the relay 40 to cause synchronous motors 44 and 83 to assume new positions. When the stylus 131 has moved to its extreme right hand position during a hunting cycle the synchronous motor 44 will correspondingly have moved the cam 103 to the position shown in Fig. 2 of the drawings where the cam switch 102 is opened thereby deenergizing the relay 115. At this instant however, the cam switch 145 closes an energization circuit for the motor 83 to cause the motor 83 to move the stylus 131 to the position shown in Fig. 2 of the drawings.

When the receiver 10 is turned off the electromagnet comprising the winding 142 is deenergized through deenergization of the relay 114. However, due to the provision of the indexing or homing cam switch 46 the apparatus at the receiver attachment 100 is restored to the position shown. Similarly the stylus 131 is returned to the position shown.

In the event of power failure at the central station 107 the relays 110, 114, and 115 are deenergized, simultaneously deenergizing the motors 44 and 83. Regardless of what happens at the wave signal receiver 10 when power is restored the synchronous motors 44 and 83 start where they left off and are in phase. A power failure will be indicated by the absence of a "tail off" trace on the recording element 75 as is fully described in copending Bateman et al. application referred to above.

A power failure at the receiver attachment end of the apparatus causes relays 24 and 40 to be deenergized, whereupon at the central station it appears as if the wave signal receiver 10 were turned off. There is, however, no tail off trace produced on the recording element 75 when power is again restored at the receiver attachment and the synchronous motors 44 and 83 are in phase and remain so through normal operation.

It will be understood by those skilled in the art that leased telephone lines for carrying direct current are more expensive from a lease standpoint than telephone lines for carrying alternating current. Also when the power source is at the central station and the change in impedance or resistance occurs at the remotely located receiver attachment, relatively sensitive relays must be employed at the central station to detect the variations in current level.

Figure 3:
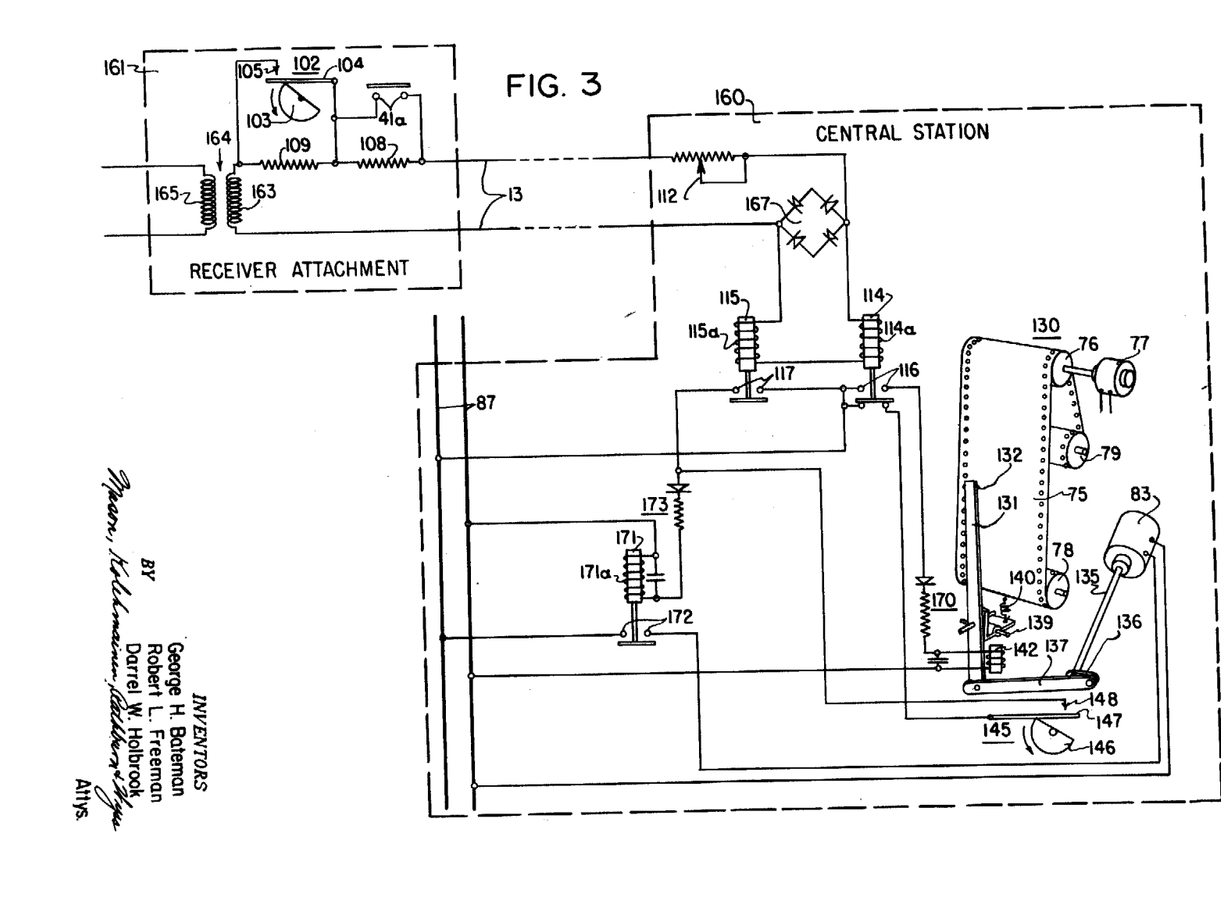
Fig. 3 is a schematic diagram illustrating a modification of Fig. 2.

In Fig. 3 of the drawings there is disclosed an arrangement where an alternating current source located at the receiver attachment is employed for energizing the telephone lines. In Fig. 3 the telephone lines 13 interconnect a central station 160 with a receiver attachment schematically indicated at 161 associated with a wave signal receiver not shown. At the receiver end the telephone lines 13 are connected in series with the resistors 108 and 109 and the secondary winding 163 of a transformer 164 whose primary winding 165 is energized in response to energization of the series relay 24 described above. The transformer 164 is effectively an isolating transformer, isolating the telephone lines 13 from the power source. The ends of the telephone wires 13 remote from the receiver attachment 161 are connected through a suitable rectifier unit 167 with the serially arranged windings 114a and 115a of the relays 114 and 115 respectively. When the wave signal receiver associated with the receiver attachment 161 is turned off the cam switch 102 is open and the contacts 41a of the relay 40 are also open. The contacts 41a are closed whenever the receiver is turned on except when the hunter unit shows listening. The shorting of the resistor 108 which occurs thereby causes an intermediate level of current to flow through the telephone wires 13 causing energization of the relay 114 to close its contacts 116, resulting in the energization of the winding 142 of the electromagnet controlling the stylus 131.

As illustrated the central station is provided with a source of alternating potential 87 as in Fig. 2 of the drawings which is connected to supply the winding 142 of the electromagnet through a suitable rectifier and filter unit generally designated at 170 and the contacts 116 of the relay 114. Instead of the relay 115 directly controlling the motor 83 driving the stylus 131, a stylus control relay 171 is provided which has a set of normally open contacts 172 connected in the energization circuit of the synchronous motor 83. The winding 171a of the relay 171 is connected across the alternating current source 87 through a rectifier and filter unit generally designated at 173 and through the contacts 117 of the relay 115. The synchronous motor 83 drives a cam switch 145 identical with that disclosed in Fig. 2 which is connected to maintain the relay 171 energized when the stylus 131 has moved to the right hand edge of the record tape 75 or in other words during the re-trace stroke of the stylus 131.

In view of the detailed description included above the operation of the synchronous motor 83 as shown in Fig. 3 of the drawings will be understood by those skilled in the art. Two levels of alternating current flowing through the telephone wires 13 maintain the synchronous motors at each end of the telephone wires in synchronism to provide an accurate indication at all times of the tuning condition of the wave signal receiver.

It will be understood that the telephone lines 13 might normally comprise leased telephone wires. The leasing of a pair of telephone wires would of course be substantially more expensive than the leasing of a single wire and it would be desirable to employ an arrangement in which only a single telephone wire were required with ground return or where the use of telephone wires might be dispensed with entirely and a radio link of some sort employed. Obviously in such an arrangement the multiple level current schemes disclosed in Figs. 2 and 3 of the drawings will not be satisfactory and it is necessary to resort to some other arrangement where some other characteristics which may be varied are employed to control the synchronous motors remotely disposed with respect to each other. Various means for accomplishing this might be employed such, for example, as the use of pulses which may be varied in phase, group, duration, shape and the like to perform the desired control operation. One characteristic which might readily be employed is the use of a plurality of different frequencies which can readily be transmitted over a single telephone line with ground return or which can be transmitted by means of a radio link. The variation in current level scheme is of course not satisfactory when one telephone line with ground return is employed due to the fact that there are substantial variations in the ground impedance which tend to cause unsatisfactory operation. In Fig. 4 of the drawings there is illustrated an arrangement whereby a single telephone wire or a radio link may be employed to interconnect the receiver attachment with a remote central station.

In Fig. 4 of the drawings the receiver attachment is substantially modified from that of Figs. 1, 2 and 3 of the drawings in that the connection with the local oscillator of the wave signal receiver has been entirely dispensed with and actually the arrangement shown in Fig. 4 operates satisfactorily with any receivers whether of the superheterodyne type or not.

Referring now to Fig. 4 of the drawings there is illustrated a wave signal receiver 200, the corresponding parts of which are designated by the same reference numerals as in the preceding figures of the drawing. In order to provide an indication of the tuning condition of the wave signal receiver 200 a position switch generally indicated at 201 is provided in a receiver attachment 202 which position switch is arranged to assume various switching positions in dependence upon the tuning condition of the wave signal receiver 200. Any suitable position switch may be employed and the arrangement illustrated is substantially identical with that disclosed and claimed in co-pending applications, Serial Numbers 7,647 and 7,648, Rahmel and Bentley, and Rahmel, respectively, both filed February 11, 1948 and assigned to the same assignee as the present application, now Patents 2,484,733 and 2,484,734, respectively. Preferably the position switch is of the type disclosed and claimed in copending Krahulec application Serial No. 78,926 filed March 1, 1949, also assigned to the same assignee as the present application. As schematically illustrated the switch 201 comprises a movable member 204 which is connected with the tuning shaft of the wave signal receiver 200 by any suitable means generally indicated at 205. As schematically illustrated the means 205 is in the form of a cord or cable associated with the tuning knob 206 of the receiver 200 so as to change the position of switch member 204 in response to the changes in position of the tuning knob 206. The switching member 204 is adapted to selectively interconnect an elongated contact 208, which is connected to ground or —B potential as indicated at 209, with one of a plurality of spaced contacts 210 specifically designated as 210a, 210b, 210c, 210d, 210e, 210f, 210g, 210h, 210i, 210j, 210k and 210m. The contacts 210a to 210m, inclusive of the position switch 201 are preferably connected with corresponding spaced contacts 211a to 211m, inclusive, of a channel switch generally designated at 212. The channel switch 212 comprises a switching arm 213 preferably arranged to successively engage the contacts 211, which are arranged in the form of a circle uniformly spaced from each other. The switching arm 213 is preferably drivingly connected with the shaft 45 of the synchronous motor and gear train unit 44 which may be identical with the motor 44 described in the preceding figures capable of rotating the shaft 45 preferably at one revolution per minute. It will be apparent that the channelizing switch 212 effectively divides the tuning positions of the wave signal receiver 200 into a plurality of uniformly spaced channels. Twelve such channels are illustrated in Fig. 4 of the drawings. It will be understood that the contacts 210 of the switch 201 will be suitably positioned and constructed, so that regardless of the tuning condition of the wave signal receiver 200, when it is tuned to a station corresponding to one of the contacts 210, a circuit is completed from ground 209 to the switching arm 213, at the instant the channelizing switch 212 is in a position such that the switching arm 213 engages a contact connected to the particular contact 210 which is effective at that time.

The receiver attachment 202 as in the preceding figures includes a power supply unit 23 comprising the series relay 24 which in addition to the contacts 28 includes a normally closed set of contacts 28b, that is, the contacts 28b are closed when the series relay 24 is deenergized.

As in the preceding figures in addition to the receiver attachment 202, there is also provided a central station 215, which is preferably remotely located with respect to the receiver attachment 202 and consequently the wave signal receiver 200. The central station 215 and the receiver attachment 202 may be interconnected by a radio link of some sort, which will be well understood by those skilled in the art, an ordinary sixty-cycle power line, or as illustrated, may be connected by a single telephone line 216 which is illustrated as provided with a dotted line section in order to indicate the remote relationship between the receiver attachment 202 and the central station 215. The single telephone line 216 with ground return is completely satisfactory with the arrangement to be described for relating the station at the receiver in the form of a receiver attachment with a remote station specifically designated as the central station 215. The corresponding parts of the central station and the receiver attachment identical with the parts of the arrangements previously described are designated by the same reference numerals and no further discussion thereof is made in connection with Fig. 4 of the drawings.

The receiver attachment 202 includes a pair of generators generally designated at 220 and 221 which are each capable of generating signals of predetermined frequencies. As illustrated the generator 220 has been specifically designated by way of example as a 200-cycle oscillator while the generator 221 has been designated as a 300-cycle oscillator. It will be apparent that any suitable means for producing signals having different characteristics may be provided and the specific disclosure of the oscillators 220 and 221 is by way of example only. The outputs of the oscillators 220 and 221 are connected by suitable coupling capacitors 222 and 223 respectively with the end of the telephone line 216 adjacent the receiver attachment 202. If the power line rather than a telephone line is employed as the link the frequencies of the oscillators 220 and 221 would merely be multiplied by a factor of ten or the like. By properly controlling the operating condition of the oscillators 220 and 221 in a manner to be described hereinafter, suitable control of a synchronous motor and gear train unit 83 at the central station may be obtained.

In order to control the synchronous motor 83 in response to the operation of the oscillators 220 and 221 the central station 215 is provided with a pair of amplifier and detector units 227 and 226 respectively, the inputs of which are connected by suitable coupling capacitors 229 and 228 respectively with the end of the telephone line 216 remote from the receiver attachment 202. The outputs of the amplifier and detector units 226 and 227 are adapted respectively to the control relays 230 and 231. As illustrated the amplifier and detector unit 226 is a three-hundred cycle amplifier and detector unit capable of detecting a signal of the order of three hundred cycles which is received from the telephone line 216. Normally the amplifier and detector unit 226 is energized and the output thereof energizes the relay 230 to open its contacts 230a. When a signal having a frequency of three hundred cycles is detected by the unit 226 the relay 230 is energized to open the contacts 230a.

Similarly the amplifier and detector unit 227 is illustrated as a two hundred-cycle amplifier and detector unit capable of detecting the presence of a signal having a frequency of the order of two hundred cycles. Normally and in the absence of the presence of the two hundred cycle signal the relay 231 is energized to open its contacts 231a and close its two sets of contacts 231b and 231c respectively. When the two hundred-cycle oscillator 231 is effective to produce a signal which is detected by the unit 227, the relay 231 is deenergized whereby contacts 231a are closed and contacts 231b and 231c are opened.

For the purpose of controlling the synchronous motor 83 in response to predetermined operations of the relays 230 and 231, the motor 83 is connected to the power source 87 through the contacts 230a of the relay 230 connected in series with the contacts 231b of the relay 231 and a cam switch comprising the switching member 233 and a contact 234. The switch comprising the members 233 and 234 is adapted to be closed only for a predetermined indexing position of the synchronous motor 83. It will be apparent that with the circuit described thus far the synchronous motor 83 will be energized in response to the presence of a three hundred-cycle signal and the absence of a two hundred-cycle signal when the synchronous motor is in its homing or indexing position shown in Fig. 4 of the drawings. The synchronous motor 83, however, can also be energized through the contacts 231a which are connected in series with the contacts 230a and the cam switch comprising the switching member 233 and a stationary contact member 235 which latter cam switch is closed for all positions except the homing or indexing position of the synchronous motor 83. The synchronous motor 83 may further be energized through the contacts 231c and the contact 235 in the absence of any signal from the receiver attachment 202 or at any rate in the absence of a two hundred-cycle signal when the synchronous motor 83 is in other than its homing or indexing position. The presence or absence of a three hundred-cycle signal has no effect under these conditions.

The synchronous motor is illustrated as being drivingly connected by its shaft 135 to the recorder unit 240. The recorder unit 240 is in many respects similar to the recorder 130 disclosed in Figs. 2 and 3 of the drawings and the corresponding parts are designated by the same reference numerals. However, the recorder 240 is provided with a quick return stylus 241 which is normally biased by a spring 242 against a stop 243. The stylus 241 is pivotally mounted upon a shaft 244 connected to a crank arm 245, having a cam follower 246 at its free end. The cam follower 246 is adapted to engage the periphery of a cam 247 mounted upon the shaft 135. The crank 245 is preferably designed to permit proper cooperation of the cam follower 246 with the cam 247. It will be apparent that when the high point of the cam 247 engages the cam follower 246 the inscribing point 241a of the stylus 241 is moved to the right hand edge of the recording element or tape 75 as viewed in Fig. 4 of the drawings. Immediately upon rotation of the cam 247 in the direction of the arrow indicated, the cam follower 246 passes the high point of the cam whereupon the spring 242 is free to move the stylus 241 at high speed to the left hand edge of the recording element 75. Thereafter the cam surface of the cam 247 causes the stylus 241 to move across the recording element 75 with the inscribing portion 241a producing a trace in a well understood manner. If the synchronous motor should be deenergized at any point during its rotation the stylus 241 would produce a trace indicative of such position and also indicative of the tuning condition of the wave signal receiver 200.

Considering now the means in the receiver attachment 202 for controlling the oscillators 220 and 221, there is provided a first controlling relay 250 and a second controlling relay 252. In addition there is also provided a cam switch 254 comprising a cam 255 rotatably mounted for rotation with the motor shaft 45. The cam 255 is adapted to actuate a switching member 256 for engaging a contact 257 only when the synchronous motor 44 is in its indexing or homing position as controlled by the cam 46 described above. The first controlling relay 250 has its winding connected in series with the contacts 258 of a thermal relay 259. The thermal relay 259 is adapted to close its contacts 258 at a predetermined time after the series relay 24 is energized, which time is sufficient to permit the filaments of the electron discharge valves employed in the receiver attachment and particularly in the generators 220 and 221 to heat up to operating temperature. As illustrated a filament transformer 260 is energized from the power supply unit 23 and a resistor 261 in series with the secondary winding of the transformer 260, or as illustrated in series with the primary winding, is adapted to heat a heat sensitive element of a thermal relay 259 whereupon the contacts 258 are closed a predetermined time after the series relay 24 closes its contacts 28. The secondary winding of the filament transformer 260 is illustrated, but the connections to the filaments of the electron discharge valves have been omitted for the purpose of simplifying the drawings.

As illustrated the first controlling relay 250 has one terminal of its winding connected to the +B terminal 31 through a conductor 263 and the cam switch 254. The other terminal of the winding of the relay 250 is connected through the contacts 258 of the thermal relay 259 and a current limiting resistor 264 to the —B terminal indicated as ground 265. The first controlling relay 250 is therefore energized whenever the thermal relay 259 closes its contacts 258 and the cam switch 254 is closed which can occur only at the homing or indexing position of the synchronous motor 44.

The synchronous motor 44 is illustrated as being energized from the power supply unit 23 through conductors 267 and two parallel arranged sets of contacts 252a and 252b of the second controlling relay 252, one set of contacts 252a and 252b being connected in each of the conductors 267. It will be apparent from Fig. 4 that the synchronous motor 44 is energized whenever the series relay 24 is energized and the second controlling relay 252 is deenergized. The relay 252 might be designated as a channel switch relay primary because its energization depends on the flow of current through the channel switch 213, one terminal of the winding of the relay 252 being connected to the switching member 213 through a current limiting resistor 268 while the other terminal of the winding of the relay 252 is connected to the +B potential terminal 31 through parallel paths, one including the contacts 250a of the relay 250 and the other including the seal-in contacts 252c of the relay 252.

The relay 250 effectively controls the supply of +B potential to the 200 cycle oscillator 220 and to this end is provided with a set of contacts 250b which when closed connect the oscillator 220 with the +B potential terminal 31. The contacts 250b are closed when the relay 250 is deenergized. The relay 250 further includes a set of seal-in contacts 250c which are connected in series with the contacts 252d of the relay 252 to the source of +B potential in parallel with the cam switch 254. With this arrangement the relay 250 when once energized remains energized as long as the relay 252 is deenergized, regardless of the position of the cam switch 254 assuming of course that the thermal relay 259 maintains its contacts 258 in a closed position.

The contacts 252d of the relay 252 control the supply of +B potential to the oscillator 221 and consequently the relay 252 is effectively a control relay for the oscillator 221 while the relay 250 is a control relay for the oscillator 220.

A better understanding of the arrangement disclosed in Fig. 4 of the drawings will be obtained from a description of the operation of the apparatus. Assume, for example, that the wave signal receiver 200 is turned on and the corresponding parts of the apparatus are as illustrated in the drawings with the relays 230 and 231 energized by virtue of the absence of signals of two hundred and three hundred cycles frequency respectively. When the receiver 200 is turned on by manipulation of the on-off switch 16, the series relay 24 is energized to close its contacts 28 to supply power to the power supply unit 23. The flow of current through the resistor 261 initiates the operation of the thermal relay 259 but its contacts 258 are not closed until a predetermined time elapses. This time is sufficient to permit the electron discharge valves to heat up to the operative conditions in response to the supply of filament current thereto. Since the relay 252 is deenergized the synchronous motor 44 is energized and begins to rotate the shaft 45 at one revolution per minute, the synchronous motor starting from the homing position shown. This immediately opens the cam switch 254. The synchronous motor rotates the channel switch arm 213 for one complete revolution before anything further happens. During this time the electron discharge valves heat up and +B potential is supplied to the oscillators 220 and 221 from the terminal 31 through the contacts 250b and 252d respectively. The simultaneous presence of signals of frequencies of two hundred and three hundred cycles respectively causes the deenergization of both of the relays 230 and 231 at the central station 215. However, the simultaneous deenergization of the relays 230 and 231 does not complete an energizing circuit from the synchronous motor 83 and consequently the motor 83 remains in the position shown in Fig. 4 of the drawings. When the synchronous motor 44 has made a complete revolution the cam switch 254 again closes the circuit at the contact 257 momentarily. By this time the thermal relay 259 has closed its contacts 258 with the result that the momentary closing of the cam switch 254 causes energization of the relay 250 with the resultant opening of the contacts 250b and the closing of the contacts 250a and 250c. The opening of the contacts 250b removes +B potential from the oscillator 220 with the resultant deenergization thereof. The closing of the contacts 250c seals in the relay 250 as long as the relay 252 is deenergized and the opening of the cam switch 254 with the continuous rotation of the synchronous motor 44 will not cause deenergization of the relay 250. The closing of the contacts 250a, on the other hand, will condition the relay 252 for energization by supplying +B potential to one terminal thereof.

It will be understood that the absence of a signal having a frequency of two hundred cycles at the central station 215 will cause the relay 231 to become energized as shown. Since the presence of a signal having a frequency of three hundred cycles causes the relay 230 to remain deenergized with its contacts 230a closed with the net result that the synchronous motor 83 is energized and follows the motion of the channel switch motor 44. The synchronous motor 44 continues to rotate the channel switch arm 213 until it engages the contact 211 corresponding with the switch contact 210 engaged by the switching member 204 which is indicative of the channel to which the wave signal receiver 200 is tuned. At this instant the energizing circuit for the relay 252 is completed through the channel switch 212 and the station selector switch 201 with the result that the relay 252 opens its contacts 252a and 252b to stop the synchronous motor 44. Simultaneously it opens its contacts 252d to remove +B potential from the oscillator 221. The absence of a signal having a frequency of three hundred cycles at the central station 215 causes operation of the relay 230 to open the circuit of the synchronous motor 83. The relay 252 is sealed in by virtue of its seal-in contacts 252c and remains in this condition so long as the wave signal receiver 200 remains tuned to the particular channel which has caused the synchronous motor 44 to stop in the predetermined position. The opening of the contacts 252d of the relay 252 interrupts the circuit for the relay 250 which drops out re-storing +B potential to the two hundred cycle oscillator with the result that a signal having a frequency of two hundred cycles is again supplied to the central station 215, deenergizing the relay 231 thereby stopping the synchronous motor 83 at the same position that the synchronous motor 44 is stopped. When the receiver 200 is turned off, the series relay 24 is deenergized opening its contacts 20, whereupon the source of +B potential is interrupted. The closing of contacts 28b completes a circuit in parallel with the winding of the relay 252 through the channel switch arm 213 thereby causing immediate deenergization of the relay 252. This causes the relay 230 to assume the position shown in Fig. 4 with the result that the synchronous motor 83 can only be energized through the contacts 231c and the contact 235 of the cam switch thereby causing the synchronous motor 83 to return to its homing or indexing position. Similarly the cam switch 46 causes the synchronous motor 44 at the receiver attachment to return to its indexing or homing position ready for the next operation of the receiver attachment following a subsequent turning on of the receiver 200.

Changing the tuning of the receiver 200, without turning off the receiver, causes movement of the switch arm 213 and breaks the energization circuit of the relay 252 whereupon motor 44 is reenergized and the 300-cycle oscillator is simultaneously rendered effective. Since the 200-cycle oscillator has been operating the motor 83 is restarted with the circuit completed through contacts 230a, 231a and 235.

As has been mentioned above, it may be desirable, instead of employing one or more telephone lines to employ the sixty-cycle power lines themselves as the link between the receiver attachment and the central station. This would be particularly desirable in the case where the central station is located in a collaborator's home to record the listening habits of wave signal receivers disposed in the home. In such a case, the arrangement of Fig. 4 would be entirely satisfactory if the frequency of the oscillators 220 and 221 were increased about ten fold. Consequently, by way of example, a three thousand cycle and a two thousand cycle oscillator might be employed in the receiver attachment, and corresponding amplifiers and detectors would be provided in the central station. The receiver attachment and the central station would be coupled to the conventional housewiring circuit by suitable capacity coupling means which would effectively isolate the 60-cycle power current but readily pass the two thousand or three thousand cycle signal currents. Instead of the power wires a space link could obviously be employed.

It will be apparent that the present invention is particularly well adapted for use in multi-receiver homes. In such a case each receiver in the home would have a receiver attachment similar for example to that shown in Fig. 4, but the oscillator frequencies employed would be different for each receiver so as to uniquely identify the individual receivers at a single central station. At the single central station channels for receiving the signals sent out by the various receiver attachments would be provided. If desired the central station could be provided with a stylus for each receiver being monitored, or a single stylus could be employed with a time-sharing arrangement, or a single stylus could be employed which also indicates which receiver or receivers are effective to produce a record on the recording element as well as a record of the stations tuned in by such receiver or receivers.

Although several embodiments of the present invention have been illustrated and described it will be understood by those skilled in the art that various modifications and changes are capable of being made with respect thereto. It is intended in the appended claims to cover all such changes and modifications as fall within the true spirit and scope of the present invention.

What is claimed as new and desired to be secured by Letters Patent of the United States is:

1. In a system for determining the audience response to programs broadcast from different wave signal transmitters and received by a monitored wave signal receiver capable of being selectively tuned to different ones of said transmitters, the combination of a receiver attachment including means for receiving a signal from said receiver and disposed closely adjacent thereto, a central station remotely located with respect to said receiver attachment, a signal link interconnecting said receiver attachment and said central station, a first synchronous motor in said receiver attachment, receiver tuning responsive condition means for causing said first synchronous motor to assume and maintain a position indicative of the tuning condition of said receiver when said receiver is tuned to one of said transmitters, a second synchronous motor at said central station, and means including said signal link for causing said second synchronous motor to assume and maintain positions corresponding with those of said first synchronous motor.

2. In a system for determining the audience response to programs broadcast from different wave signal transmitters and received by a monitored wave signal receiver capable of being selectively tuned to different ones of said transmitters, the combination of a receiver attachment including means for receiving a signal from said receiver and disposed closely adjacent thereto, a central station remotely located with respect to said receiver attachment, a signal link interconnecting said receiver attachment and said central station, a first synchronous motor in said receiver attachment, receiver tuning responsive conditions means for energizing said first synchronous motor to cause said motor to assume a position indicative of the tuning condition of said receiver when said receiver is tuned to one of said transmitters and then deenergizing said motor, a second synchronous motor at said central station, means including said signal link for causing said second synchronous motor to be energized simultaneously with said first synchronous motor, and means responsive to the tuning of said receiver to one of said transmitters for providing at said central station a signal causing deenergization of said second motor at the instant said first motor reaches a position corresponding to the tuning condition of said receiver.

3. In a system for determining the audience response to programs broadcast from different wave signal transmitters and received by a monitored wave signal receiver capable of being selectively tuned to different ones of said transmitters, the combination of a receiver attachment including means for receiving a signal from said receiver and disposed closely adjacent thereto, a central station remotely located with respect to said receiver attachment, a signal link interconnecting said receiver attachment and said central station, a first synchronous motor in said receiver attachment, receiver tuning responsive condition means for energizing said first synchronous motor to cause said motor to assume a position indicative of the tuning condition of said receiver when said receiver is tuned to one of said transmitters and then deenergizing said motor, means for causing said first motor to assume an indexing position when said receiver is turned off, a second synchronous motor at said central station, means causing said second synchronous motor to assume an indexing position when said receiver is turned off, and means including said signal link responsive to the tuning of said receiver to one of said transmitters for causing said second synchronous motor to assume positions corresponding with those of said first synchronous motor.

4. In a system for determining the audience response to programs broadcast from different wave signal transmitters and received by a monitored wave signal receiver capable of being selectively tuned to different ones of said transmitters, the combination of a receiver attachment including means for receiving a signal from said receiver and disposed closely adjacent thereto, a central station remotely located with respect to said receiver attachment, a signal link interconnecting said receiver attachment and said central station, a first synchronous motor in said receiver attachment, receiver tuning responsive condition means for energizing said first synchronous motor to cause said motor to assume and maintain a position indicative of the tuning condition of said receiver when said receiver is tuned to one of said transmitters, a second synchronous motor at said central station, means including said signal link for causing said second synchronous motor to assume and maintain positions corresponding with those of said first synchronous motor, and means responsive to the position of said second synchronous motor for producing a record at said central station of the tuning condition of said receiver.

5. Apparatus for determining the audience response to programs broadcast from different wave signal transmitters and received by a monitored wave signal receiver capable of being selectively tuned to different ones of said transmitters, comprising a receiver attachment including means for receiving a signal from said receiver and disposed closely adjacent thereto, a central station remotely located with respect to said receiver attachment, a signal link interconnecting said receiver attachment and said central station, a first synchronous motor in said receiver attachment, receiver tuning responsive condition means for energizing said first synchronous motor to cause said motor to assume a position indicative of the tuning condition of said receiver when said receiver is tuned to one of said transmitters, a second synchronous motor at said central station, means for energizing said second motor so as to be in synchronism with said first motor, means operative at the instant said first motor reaches a position indicative of the tuning condition of said receiver for producing a signal to stop said second motor, and means for producing a record of the position of said second motor indicative of the tuning condition of said receiver.

6. In a system for determining the audience response to programs broadcast from different wave signal transmitters and received by a monitored wave signal receiver capable of being selectively tuned to different ones of said transmitters, the combination of a receiver attachment including means for receiving a signal from said receiver and disposed closely adjacent thereto, a central station remotely located with respect to said receiver attachment, a signal link interconnecting said receiver attachment and said central station, a first synchronous motor in said receiver attachment, means for energizing said first synchronous motor in response to turning on or retuning said receiver, receiver tuning responsive condition means for stopping said first synchronous motor at a position indicative of the tuning condition of said receiver when said receiver is tuned to the frequency of one of said transmitters, signal producing means for producing signals capable of being transmitted over said link, means operative simultaneously with the energization of said first motor for modifying said signal producing means to cause a signal having a first predetermined characteristic to be transmitted over said link, means operative with said means for stopping said first motor for modifying said signal producing means to cause a signal having a second predetermined characteristic to be transmitted over said link, a second synchronous motor at said central station, means for energizing said second motor in response to the transmission over said link of said signal having said first predetermined characteristic, and means for stopping said second motor in response to the transmission over said link of a signal having said second predetermined characteristic.

7. In a system for determining the audience response to programs broadcast from different wave signal transmitters and received by a monitored wave signal receiver capable of being selectively tuned to different ones of said transmitters, the combination of a receiver attachment including means for receiving a signal from said receiver and disposed closely adjacent thereto, a central station remotely located with respect to said receiver attachment, a signal link interconnecting said receiver attachment and said central station, a first synchronous motor in said receiver attachment, means for energizing said first synchronous motor in response to turning on or retuning said receiver, receiver tuning responsive condition means for stopping said first synchronous motor at a position indicative of the tuning condition of said receiver when said receiver is tuned to the frequency of one of said transmitters, signal producing means in said receiver attachment for producing signals of two different predetermined frequencies capable of being transmitted over said link, a second synchronous motor at said central station normally stopped in a predetermined position, means operative when said first motor is in a position identical with said predetermined position of said second motor for causing said signal producing means to produce a signal having only one of said two predetermined frequencies, means operative with said means for stopping said first motor for causing said signal producing means to discontinue producing a signal having said one predetermined frequency, means for energizing said second motor in response to the presence at said central station of a signal of said one frequency and the absence of the signal of the other frequency, and means for stopping said second motor in response to the absence at said central station of a signal having said one frequency.

8. In a system for determining the audience response to programs broadcast from different wave signal transmitters and received by a monitored wave signal receiver capable of being selectively tuned to different ones of said transmitters, the combination of a receiver attachment including means for receiving a signal from said receiver and disposed closely adjacent thereto, a central station remotely located with respect to said receiver attachment, a signal link interconnecting said receiver attachment and said central station, a first synchronous motor in said receiver attachment, means for energizing said first synchronous motor in response to turning on or retuning said receiver, receiver tuning responsive condition means for stopping said first synchronous motor at a position indicative of the tuning condition of said receiver when said receiver is tuned to the frequency of one of said transmitters, signal producing means for producing signals of two different predetermined frequencies capable of being transmitted over said link, means for controlling said signal producing means selectively to produce only one, both, or none of said signals of two different predetermined frequencies, a second synchronous motor at said central station, means for energizing said second motor in response to the presence of one and the absence of the other of said signals of two different predetermined frequencies, and means for stopping said second motor in response to the absence of a signal of said one predetermined frequency and the presence of a signal of the other predetermined frequency.

9. Apparatus for determining the audience response to programs broadcast from different wave signal transmitters and received by a monitored wave signal receiver capable of being selectively tuned to different ones of said transmitters, comprising a receiver attachment including means for receiving a signal from said receiver and disposed closely adjacent thereto, a central station remotely located with respect to said receiver attachment, a signal link interconnecting said receiver attachment and said central station, a first synchronous motor in said receiver attachment, means for energizing said first synchronous motor in response to turning on or retuning said receiver, receiver tuning responsive condition means for stopping said first synchronous motor at a position indicative of the tuning condition of said receiver when said receiver is tuned to the frequency of one of said transmitters, signal producing means in said receiver attachment for producing signals of two different predetermined frequencies capable of being transmitted over said link, a second synchronous motor at said central station normally stopped in a predetermined position, means operative when said first motor has rotated to a position identical with said predetermined position of said second motor for causing said signal producing means to produce a signal having only one of said two predetermined frequencies, means operative with said means for stopping said first motor for causing said signal producing means to discontinue producing a signal having said one predetermined frequency, means for energizing said second motor in response to the presence at said central station of a signal of said one frequency and the absence of the signal of the other frequency, and means for stopping said second motor in response to the absence at said central station of a signal having said one frequency and the presence of a signal of the other frequency.

10. In a system for determining the radio listening or television viewing habits of users of a wave signal receiver, the combination of a receiver attachment including means for receiving a signal from said receiver and disposed closely adjacent thereto, a central station remotely located with respect to said receiver attachment, a signal link interconnecting said receiver attachment and said central station, a first synchronous motor in said receiver attachment, means for causing said first motor to stop in an indexing position when said receiver is turned off, means for energizing said first synchronous motor when said receiver is turned on, receiver tuning responsive condition means for stopping said first synchronous motor at a position indicative of the tuning condition of said receiver when said receiver is tuned to one of a predetermined number of channels, a second synchronous motor at said central station, means including said signal link for causing said second synchronous motor to stop at an indexing position corresponding to the indexing position of said first motor, means for energizing and deenergizing said second motor simultaneously with the energization and deenergization of said first motor whereupon said second motor provides at said central station an indication of the tuning condition of said receiver.

11. Apparatus for determining the radio listening or television viewing habits of users of a wave signal receiver, comprising a receiver attachment including means for receiving a signal from said receiver and disposed closely adjacent thereto, a central station remotely located with respect to said receiver attachment, a signal link interconnecting said receiver attachment and said central station, means for causing currents of two different levels to flow over said link, a first synchronous motor in said receiver attachment, means for causing said first motor to stop in an indexing position when said receiver is turned off, means for energizing said first synchronous motor when said receiver is turned on and causing a current of one level to flow over said link, receiver tuning responsive condition means for stopping said first synchronous motor at a position indicative of the tuning condition of said receiver when said receiver is tuned to one of a predetermined number of channels and causing a current of said second level to flow over said link, a second synchronous motor at said central station, means for causing said second synchronous motor to stop at an indexing position corresponding to the indexing position of said first motor, means for energizing said second motor when a current of said first level flows over said link, and means for deenergizing said second motor when a current of said second level flows over said link, whereupon said second motor provides at said central station an indication of the tuning condition of said receiver.

12. Apparatus for determining the radio listening or television viewing habits of users of a wave signal receiver, comprising a receiver attachment including means for receiving a signal from said receiver and disposed closely adjacent thereto, a central station remotely located with respect to said receiver attachment, a signal link interconnecting said receiver attachment and said central station, means for causing signals of two different frequencies to be transmitted over said link, a first synchronous motor in said receiver attachment, means for causing said first motor to stop in an indexing position when said receiver is turned off, means for energizing said first synchronous motor when said receiver is turned on and causing a signal of one of said frequencies to be transmitted over said link, receiver tuning responsive condition means for stopping said first synchronous motor at a position indicative of the tuning condition of said receiver when said receiver is tuned to one of a predetermined number of channels and causing a signal of the other of said two different frequencies to be transmitted over said link, a second synchronous motor at said central station, means for causing said second synchronous motor to stop at an indexing position corresponding to the indexing position of said first motor, means for energizing said second motor when a signal of said one frequency is transmitted over said link, and means for deenergizing said second motor when a signal of said other frequency is transmitted over said link, whereupon said second motor provides at said central station an indication of the tuning condition of said receiver.

13. Apparatus for determining the radio listening or television viewing habits of users of a wave signal receiver, comprising a receiver attachment including means for receiving a signal from said receiver and disposed closely adjacent thereto, a central station remotely located with respect to said receiver attachment, a signal link interconnecting said receiver attachment and said central station, a source of direct current energy at said central station, means for causing currents of two different levels to flow over said link from said source, a first synchronous motor in said receiver attachment, means for causing said first motor to stop in an indexing position when said receiver is turned off, means for energizing said first synchronous motor when said receiver is turned on, means operative simultaneously with said last mentioned means for causing a current of one level to flow over said link, receiver tuning responsive condition means for stopping said first synchronous motor at a position indicative of the tuning condition of said receiver when said receiver is tuned to one of a predetermined number of channels, means operative simultaneously with said last mentioned means for causing a current of said second level to flow over said link, a second synchronous motor at said central station, means for causing said second synchronous motor to stop at an indexing position corresponding to the indexing position of said first motor, means for energizing said second motor when a current of said first level flows over said link, and means for deenergizing said second motor when a current of said second level flows over said link, whereupon said second motor provides at said central station an indication of the tuning condition of said receiver.

14. Apparatus for determining the radio listening or television viewing habits of users of a wave signal receiver, comprising a receiver attachment including means for receiving a signal from said receiver and disposed closely adjacent thereto, a central station remotely located with respect to said receiver attachment, a signal link interconnecting said receiver attachment and said central station, means for causing currents of three different levels to flow over said link, a first synchronous motor in said receiver attachment, means for causing said first motor to stop in an indexing position when said receiver is turned off, means for energizing said first synchronous motor when said receiver is turned on and causing a current of one level to flow over said link, receiver tuning responsive condition means for stopping said first synchronous motor at a position indicative of the tuning condition of said receiver when said receiver is tuned to one of a predetermined number of channels and causing a current of said second level to flow over said link, a second synchronous motor at said central station, means including said signal link for causing said second synchronous motor to stop at an indexing position corresponding to the indexing position of said first motor, means for energizing said second motor when a current of said first level flows over said link, means for deenergizing said second motor when a current of said second level flows over said link, whereupon said second motor provides at said central station an indication of the tuning condition of said receiver, and a power failure relay controlled by the current of a third level flowing over said link.

15. In a system for determining the radio listening or television viewing habits of users of wave signal receivers, the combination of a receiver attachment including means for receiving a signal from said receiver and disposed closely adjacent thereto, a central station remotely located with respect to said receiver attachment, a signal link interconnecting said receiver attachment and said central station, a first synchronous motor in said receiver attachment, means for causing said first motor to stop in an indexing position when said receiver is turned off, means for energizing said first synchronous motor when said receiver is turned on, receiver tuning responsive condition means for stopping said first synchronous motor at a position indicative of the tuning condition of said receiver when said receiver is tuned to one of a predetermined number of channels, a second synchronous motor at said central station, means including said signal link for causing said second synchronous motor to stop at an indexing position corresponding to the indexing position of said first motor, means comprising a source of signals having two different characteristics for energizing and deenergizing said second motor simultaneously with the energization and deenergization of said first motor whereupon said second motor provides at said central station an indication of the tuning condition of said receiver.

References Cited in the file of this patent

UNITED STATES PATENTS

| Number | Name | Date |
|---|---|---|
| 1,933,650 | Bascom | Nov. 7, 1933 |
| 1,959,388 | Shiokawa | May 22, 1934 |
| 1,996,677 | Leeson et al. | Apr. 2, 1935 |
| 2,249,324 | Potter | July 15, 1941 |
| 2,381,920 | Miller | Aug. 14, 1945 |
| 2,484,733 | Rahmel et al. | Oct. 11, 1949 |
| 2,484,734 | Rahmel | Oct. 11, 1949 |
| 2,618,694 | Black | Nov. 18, 1952 |